United States Patent
Koyama et al.

(10) Patent No.: US 6,572,961 B1
(45) Date of Patent: Jun. 3, 2003

(54) TRANSPARENT HARD COAT FILM CONTAINING AT LEAST TWO INORGANIC PARTICLES OF DIFFERENT PARTICLE SIZES

(75) Inventors: Masuo Koyama, Ageo (JP); Atsunobu Hirosawa, Yono (JP)

(73) Assignee: Kimoto Co., Ltd., Tokyo (JP)

( * ) Notice: Subject to any disclaimer, the term of this patent is extended or adjusted under 35 U.S.C. 154(b) by 169 days.

(21) Appl. No.: 09/657,660

(22) Filed: Sep. 7, 2000

(30) Foreign Application Priority Data

Sep. 9, 1999 (JP) ............................................. 11-255085
Sep. 17, 1999 (JP) ............................................. 11-263491

(51) Int. Cl.[7] .................................................. B32B 5/16
(52) U.S. Cl. ........................ 428/323; 428/212; 428/332
(58) Field of Search ................................. 428/323, 212, 428/332

(56) References Cited

U.S. PATENT DOCUMENTS

| 5,770,306 | A | * | 6/1998 | Suzuki et al. | 428/328 |
| 6,008,940 | A | * | 12/1999 | Michihata et al. | 359/483 |
| 6,074,741 | A | * | 6/2000 | Murata et al. | 428/327 |
| 6,217,176 | B1 | * | 4/2001 | Mackawa | 359/601 |
| 6,376,060 | B1 | * | 4/2002 | Yoshihara et al. | 428/323 |

* cited by examiner

Primary Examiner—H. Thi Le

(57) ABSTRACT

A transparent hard coat film includes a transparent polymer film and one or more transparent hard coat layers including at least an ionizing radiation curable resin and two or more kinds of inorganic particles having different average diameters. The transparent hard coat film prevents glare of a color screen when it is placed on a high definition color display. It also prevents glare caused by external light without causing blurring of the screen images due to degradation of transparency and improves visibility of the display.

9 Claims, 1 Drawing Sheet

TRANSPARENT HARD COAT FILM CONTAINING AT LEAST TWO INORGANIC PARTICLES OF DIFFERENT PARTICLE SIZES

TECHNICAL FIELD

The present invention relates to a transparent hard coat film, particularly a transparent hard coat film suitable for a surface base material of a transparent touch panel or the like used on the display screen of a color CRT, a flat panel display or the like.

BACKGROUND OF INVENTION

Conventionally, a transparent hard coat film obtained by subjecting a transparent polymer film to a surface roughening treatment is used for a transparent touch panel provided on the display screen of a CRT, flat panel display or the like, so as to prevent viewing difficulty due to glare from external light reflected by the display screen. In the surface roughening treatment perfomed on the transparent polymer film, a transparent hard coat layer containing inorganic particles or synthetic resin particles having a relatively uniform diameter of several μm to a few tens of μm is generally used so as to prevent glare without degrading transparency.

On the other hand, owing to advances in the color performance of CRTs and flat panel displays using touch panel displays and also higher color definition in various displays, a problem has arisen that, when a conventional transparent hard coat film subjected to a surface roughening treatment for preventing glare is used in a touch panel, the high-definition color screen, particularly the white portions thereof, produce glare.

Accordingly, an object of the present invention is to provide a transparent hard coat film having excellent display visibility, wherein color screen glare is not caused even when the film is laminated on a high-definition color display surface, and capable of preventing glare due to external light without causing blurring of the image display due to degradation of transparency, as is experienced with conventional transparent hard coat films.

SUMMARY OF THE INVENTION

As a result of extensive studies on the rough surface layer of the conventional transparent hard coat film, the present inventors found that, (1) since inorganic particles or synthetic resin particles having a relatively uniform diameter of several μm to a few tens of μm are used to form the rough surface, the protrusions and recesses, which are regular and smooth, have about the same intervals as the intervals of the RGB light-emitting points, (2) since these regular and smooth protrusions and recesses on the surface act as lenses, the RGB light-emitting points, which are the source of the color display, are enlarged and emphasized, and (3) consequently the light emitting white portions of the screen, where all the RGB light-emitting points emit light, become particularly notable sources of glare. They accomplished the present invention based on this knowledge.

Specifically, the present invention provides a transparent hard coat film characterized in that a transparent hard coat layer composed of at least an ionizing radiation curable resin and two or more kinds of inorganic particles having different average diameters is provided on a transparent polymer film.

The transparent hard coat film of the present invention is also characterized in that the inorganic particles are at least two kinds of inorganic particles having an average diameter of 1–15 μm and an average diameter of 5–50 nm.

In the above-described transparent hard coat film of the present invention, the transparent hard coat layer may consist of a single layer or multiple layers. In the case of one layer, the layer contains two or more kinds of inorganic particles having different average diameters. In the case of multiple layers, each of two or more kinds of inorganic particles having different average diameters may be incorporated in a different layer. In this case, inorganic particles having larger diameter are contained in the layer(s) on the side of the transparent polymer film and inorganic particles having smaller diameter are contained in the outer layer(s).

That is, a transparent hard coat film according to a first aspect of the present invention is characterized in that a single-layer transparent hard coat layer composed of at least an ionizing radiation curable resin and two or more kinds of inorganic particles having different average diameters is provided on a transparent polymer film.

A transparent hard coat film according to a second aspect of the present invention is characterized in that a first transparent hard coat layer containing at least an ionizing radiation curable resin and inorganic particles having an average diameter 1–15 um and a second transparent hard coat layer containing at least an ionizing radiation curable resin and inorganic particles having an average diameter of 5–50 nm are provided successively on a transparent polymer film.

The transparent hard coat film of the present invention is also characterized in that the first transparent hard coat layer has a film thickness of 2–15 μm and the second transparent hard coat layer has a film thickness of 0.2–1.5 μm.

BEST MODE FOR CARRYING OUT THE INVENTION

The transparent hard coat film of the present invention will be described in further detail.

Figure 1:
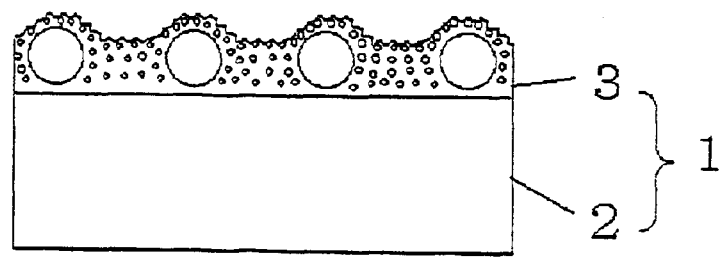
FIG. 1 is a cross-sectional view showing an embodiment of a transparent hard coat film according to the first aspect of the present invention.

FIG. 1 is a view showing a transparent hard coat film according to the first aspect of the present invention, which has a single transparent hard coat layer. This transparent hard coat film 1 is obtained by forming a transparent hard coat layer 3 on a transparent polymer film 2. The transparent hard coat layer 3 is composed of at least an ionizing radiation curable resin and two or more kinds of inorganic particles having different average diameters.

Figure 2:
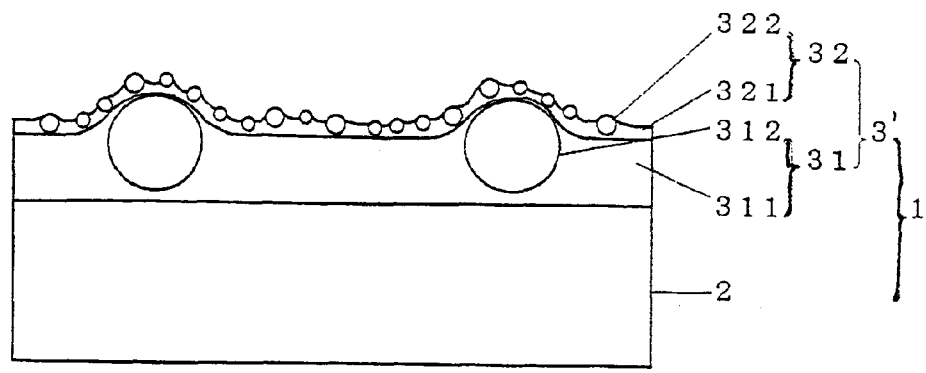
FIG. 2 is a cross-sectional view showing an embodiment of a transparent hard coat film according to the second aspect of the present invention.

FIG. 2 is a view showing a transparent hard coat film according to the second aspect of the present invention, which has two transparent hard coat layers. This transparent hard coat film 1 is obtained by successively providing a first transparent hard coat layer 31 and a second transparent hard coat layer 32 on a transparent polymer film 2. The first transparent hard coat layer 31 contains at least an ionizing radiation curable resin 311 and inorganic particles 312 having an average diameter of 1–15 μm and the second transparent hard coat layer 32 contains at least an ionizing radiation curable resin 321 and inorganic particles 322 having an average diameter of 5–50 nm. Hereinafter, the first transparent hard coat layer 31 and the second transparent hard coat layer 32 combined will sometimes be referred to as transparent hard coat layer 3'.

The transparency of the transparent hard coat film of the present invention can be evaluated by using the haze value determined by the method of JIS-K7105 for the transparent hard coat layer 3 or 3' formed on the transparent polymer film 2. To obtain high (excellent) transparency, a haze value of 10% or less is preferable.

The hard coating property of the transparent hard coat film of the present invention is evaluated in terms of pencil hardness by the method of JIS-K5400 after the transparent hard coat 3 or 3' has been formed on the transparent polymer film 2. A hardness of H or greater is preferable.

The components of the transparent hard coat film of the first and second aspects will be described in detail.

As a transparent polymer film 2, one which does not inhibit transparency, such as polyethylene terephthalate, polybutylene terephthalate, polycarbonate, polypropylene, polyethylene, acrylic resins, acetyl cellulose and vinyl chloride, can be used. A stretched film, particularly a biaxially stretched film, is preferable for its improved mechanical strength and dimensional stability.. The thickness can be appropriately selected depending on the material to be used, but, in general, is 20–500 μm, preferably 50–200 μm.

The transparent hard coat layer 3, 3' formed on the transparent polymer film 2 simultaneously imparts two properties generally considered to be incompatible. Specifically, it imparts a property of preventing glare caused by reflected external light and a property of preventing blurring of the display image due to degradation of transparency (hereinafter referred to as "glare preventing property" and "transparency", respectively). It also has a property of preventing of generation of screen glare due to enlarged and emphasized RGB light-emitting points in a color display (hereinafter referred to as "RGB glare preventing property").

The above-described transparent hard coat layer 3, 3' can be obtained by applying a coat of a composition which contains an ionizing radiation curable resin as its main ingredient and is mixed with inorganic particles, and then exposing the composition to ionizing radiation (UV or electron beam) to cross-link and cure the coating.

The ionizing radiation curable resin may be composed of a paint, which can be cross-linked and cured by exposure to ionizing radiation (UV or electron beam). As the ionizing radiation curable paint, one or more kinds of a photopolymerizable prepolymer or photopolymerizable monomer can be used.

As the photopolymerizable prepolymer, an acrylic prepolymer, which has two or more acryloyl groups per molecule and becomes a three-dimensional network structure after cross-linking and curing is particularly preferable. Usable acrylic prepolymers include urethane acrylate, polyester acrylate, epoxy acrylate, melamine acrylate and the like.

Usable phdtopolymerizable monomers include multifunctional monomers such as trimethylolpropane triacrylate, pentaerythritol triacrylate, dipentaerythritol hexaacrylate, dipentaerythritol monohydroxy pentaacrylate, neopentylglycol diacrylate, tripropyleneglycol triacrylate, diethyleneglycol diacrylate and 1,6-hexanediol diacrylate.

Various kinds of additives can be added to the ionizing radiation curable paint. When UV is used for curing, it is preferable to add a photopolymerization initiator, UV intensifier or the like to improve the cross-linking and curing property and the hardness of the cross-linked and cured coating.

Usable photopolymerization initiators include acetophenone, benzophenone, Michler's ketone, benzoin, benzylmethylketal, benzoyl benzoate, α-acyloxyme ester, thioxanthenes and the like. As the UV intensifiers, n-butylamine, triethylamine, tri-n-butylphosphine and the like are suitable.

The ionizing radiation curable resin imparts hard coating property to the transparent hard coat layer 3, 3', and, when combined with inorganic particles as described later, also imparts transparency and glare preventing property, and RGB glare preventing property.

The resin for forming the transparent hard coat layer 3 can be an ionizing radiation curable resin mixed with other thermoplastic resins or thermosetting resins so long as the aforementioned effects can be attained.

Usable thermoplastic resins include cellulose derivatives such as acetylcellulose, nitrocellulose, acetylbutylcellulose, ethylcellulose and methylcellulose, vinyl resins such as vinyl acetate and copolymers thereof, vinyl chloride and copolymers thereof, and vinylidene chloride and copolymers thereof, acetal resins such as polyvinyl formal and polyvinyl butyral, acrylic resins such as acrylic resins and copolymers thereof and methacrylic resins and copolymers thereof, polystyrene resins, polyamide resins, linear polyester resins, polycarbonate resins and the like.

Usable thermosetting resins include thermosetting urethane resins composed of acrylic polyol and isocyanate prepolymer, phenol resins, urea-melamine resins, epoxy resins, unsaturated polyester resins, silicon resins and the like.

The inorganic particles contained in the aforementioned transparent hard coat layer 3, 3' will now be described. Usable inorganic particles include inorganic pigments and extender pigments such as silica, alumina, talc, clay, calcium carbonate, magnesium carbonate, barium sulfate, aluminium hydroxide, titanium dioxide and zirconium oxide. One or two kinds of these pigments can be used.

When the transparent hard coat layer is constituted of a single layer as shown in FIG. 1, two or more of these having different average diameters are mixed for use. In using the two or more kinds of inorganic particles having different average diameters, it is preferable for at least one kind of inorganic particles having a relatively large average particle diameter of 1–15 μm to be combined with at least one kind of other inorganic particles having a relatively small average particle diameter of 5–50 nm. The mixing ratio of larger inorganic particles having an average diameter of 1–15 μm is 1–8 weight parts, preferably 2–6 weight parts based on 100 weight parts of the ionizing radiation curable resin. The ratio of the smaller inorganic particles having an average diameter of 5–50 nm is 1–8 weight parts, preferably 2–6 weight parts based on 100 weight parts of the ionizing radiation curable resin.

These two or more kinds of inorganic particles having different average diameters, when combined with the aforementioned ionizing radiation curable resin, can impart transparency and glare preventing property to the film and can satisfy the RGB glare preventing property requirement.

The surface of the ionizing radiation curable resin coating containing the particulate substances comes to have unique wave-like protrusions and recesses. Relatively large wave-like protrusions and recesses and relatively small wave-like protrusions and recesses are formed on the single-layer transparent hard coat layer 3 containing these two kinds of inorganic particles having different average diameters (FIG. 1). The former ones produce an excellent glare preventing property while maintaining high transparency, and the later ones prevent RGB glare. Moreover, use of the wave-like protrusions and recesses reduces the amount of the inorganic particles required as particulate substances for obtaining the aforementioned effects.

In the case of a single layer, the thickness of the transparent hard coat layer 3 is not limited so long as it is within the range enabling the aforementioned properties to be obtained, but can be appropriately adjusted within a range of 2–15 μm, preferably 3–8 μm.

On the other hand, when the transparent hard coat layer is composed of a first transparent hard coat layer 31 and a second transparent hard coat layer 32 as shown in FIG. 2, it is preferable that inorganic particles with a larger average diameter (referred to as "large-diameter inorganic particles" hereinafter) 312 are used in the first transparent hard coat layer 31 among the two kinds of inorganic particles, and inorganic particles with a smaller average diameter (referred to as "small-diameter inorganic particles" hereinafter) 322 are used in the second transparent hard coat layer 32. The large-diameter inorganic particles and small-diameter inorganic particles may be made of the same material or different materials.

The large-diameter inorganic particles 312 contained in the first transparent hard coat layer 31 primarily play a role of imparting glare preventing property to the transparent hard coat layer 3'. Their average diameter is preferably 1–15 μm, more preferably 2–10 μm. The mixing ratio of the large-diameter inorganic particles 312 to the ionizing radiation curable resin 311 is 1–8 weight parts, preferably 2–6 weight parts based on 100 weight parts of the ionizing radiation curable resin.

The small-diameter inorganic particles 322 contained in the second transparent hard coat layer 32 primarily play a role of imparting RGB glare preventing property to the transparent hard coat layer 3'. Their average diameter is preferably 5–50 nm, more preferably 10–30 nm. The mixing ratio of the small-diameter inorganic particles 322 to the ionizing radiation curable resin 321 is 1–8 weight parts, more preferably 2–6 weight parts based on 100 weight parts of the ionizing radiation curable resin.

The thickness of the first transparent hard coat layer 31 is preferably 2–15 μm, more preferably 3–8 μm. The thickness of the second transparent hard coat layer 32 is preferably 0.2–1.5 μm, more preferably 0.5–1.0 μm.

When the transparent hard coat layer is composed of two layers as describe above, the first transparent hard coat layer 31 containing large-diameter inorganic particles 312 and the second transparent hard coat layer 32 containing small-diameter inorganic particles 322 are provided on the transparent polymer film 2 in this order. Consequently, transparency and glare preventing property are both imparted to the film and RGB glare preventing property can also be achieved.

In this case, as in the case of a single layer, when wave-like protrusions and recesses generated uniquely in an ionizing radiation curable resin coating containing particulate substances (large-diameter inorganic particles) are utilized, high transparency is maintained thanks to the reduced content of the inorganic particles in the first transparent hard coat layer 31 and, at the same time, an excellent glare preventing property is achieved. Further, by providing the second transparent hard coat layer 32 containing small-diameter inorganic particles 322 on the first transparent hard coat layer 31 containing large-diameter inorganic particles 312, the glare at RGB light-emitting points, that would be generated if only the first transparent hard coat layer 31 were provided, can be prevented, that is, RGB glare preventing property can be imparted to the transparent hard coat layer 3'.

UV having an energy of 50–300 kcal/mol and a wavelength in the range of 100–400 nm, preferably 200–400 nm, is used for cross-linking and curing the transparent hard coat layer 3, 3'. Such UV can be applied by using an ultra-high-pressure mercury-vapor lamp, high-pressure mercury-vapor lamp, low-pressure mercury-vapor lamp, carbon arc, metal halide lamp or the like.

Otherwise, an electron beam having an acceleration voltage of 1000 keV or less, preferably an energy of 100–300 keV and a wavelength in the range of 100 nm or less can be used. Such an electron beam can be applied by using a scan-type or curtain-type electron beam accelerator.

In case of curing by application of ionizing radiation, the presence of oxygen and the coating thickness are closely related. Since radicals generated by applying ionizing radiation capture oxygen, the curing is inhibited. Therefore, if the coating is thin, the ratio of surface area to coating volume becomes large and curing is easily inhibited by oxygen in the air. In order to prevent this curing inhibition, it is preferable to perform irradiation under an inert gas such as $N_2$ gas.

As pointed out above, the transparent hard coat film of the present invention has extremely good visibility because the transparency is not degraded, viewing difficulty due to glare caused by reflected external light and viewing difficulty caused by RGB glare are prevented by providing a transparent hard coat layer comprising at least an ionizing radiation curable resin and two or more kinds of inorganic particles having different average diameters on a transparent polymer film or providing a first transparent hard coat layer containing an ionizing radiation curable resin and large-diameter inorganic particles and a second transparent hard coat layer containing an ionizing radiation curable resin and small-diameter inorganic particles successively on the transparent polymer film.

EXAMPLES

Working examples of the present invention will be now described. In the examples, "part" and "%" are based on weight unless otherwise defined.

[Examples 1–3]

To prepare the transparent hard coat films of Examples 1–3, transparent hard coat layer coating solutions (a)–(c) having the compositions shown in Table 1 were applied on one surface of a polyethylene terephthalate film having a thickness of 100 μm (COSMOSHINE A4300: Toyobo Co., Ltd.), heated and dried at 60° C. for 5 minutes, and then exposed to UV from a high-pressure mercury-vapor lamp for 1–2 seconds to form a transparent hard coat layer having a thickness of about 5 μm.

[Comparative Examples 1–4]

To prepare the transparent hard coat films of Comparative Examples 1–4, transparent hard coat layer coating solutions (d)–(g) having the compositions shown in Table 2 were applied on one surface of a polyethylene terephthalate film having a thickness of 100 μm (COSMOSHINE A4300: Toyobo Co., Ltd.), heated and dried at 60° C. for 5 minutes, and then exposed to UV from a high-pressure mercury-vapor lamp for 1–2 seconds to form a transparent hard coat layer having a thickness of about 5 μm.

[Comparative Example 5]

To prepare a transparent hard coat film, a transparent hard coat layer coating solution (h) having the composition shown in Table 2 was applied on one surface of a polyethylene terephthalate film having a thickness of 100 μm (COSMOSHINEA4300: Toyobo Co., Ltd.) and heated and dried at 120° C. for 5 minutes to form a transparent hard coat layer having a thickness of about 5 μm.

Resin A in Tables 1 and 2 is an ionizing radiation curable resin (Diabeam UR6530: Mitsubishi Rayon Co., Ltd.), resin B is a thermoplastic acrylic resin (LMS-55, solid content 40%: Goo Chemical Co., Ltd.), resin C is a thermoplastic acetal resin (Ethlec BL-S: Sekisui Chemical Co., Ltd.) and resin D is a thermosetting silicon resin (Si Coat 900, solid content 30%: Daihachi Chemical Industry Co., Ltd.). Inorganic particles E are porous silica (SYLYSIA 446, average diameter 4.5 μm: Fuji Silysia Chemical Co., Ltd.), inorganic particles Farefine powder silica (Aerosil 50, average diameter 30 nm: Nippon Aerosil Co., Ltd.). Additive G is a photopolymerization initiator (IRGACURE 651: Ciba Specialty Chemicals).

TABLE 1

| | coating solution for transparent hard coat layer(parts) | | |
|---|---|---|---|
| materials | a | b | c |
| resin A | 30.0 | 27.0 | 27.0 |
| resin B | — | 7.5 | — |
| resin C | — | — | 3.0 |
| Inorganic particles E | 1.5 | 1.2 | 1.8 |
| Inorganic particles F | 1.5 | 1.2 | 1.8 |
| additive G | 0.15 | 0.15 | 0.15 |
| Methylethylketone | 40.0 | 35.5 | 40.0 |
| toluene | 30.0 | 30.0 | 30.0 |

TABLE 2

| | coating solution for transparent hard coat layer(parts) | | | | |
|---|---|---|---|---|---|
| materials | d | e | f | g | h |
| resin A | 30.0 | 30.0 | 30.0 | 30.0 | — |
| resin D | — | — | — | — | 100.0 |
| inorganic particles E | 1.5 | — | 3.0 | — | 1.5 |
| inorganic particles F | — | 1.5 | — | 3.0 | 1.5 |
| additive G | 0.15 | 0.15 | 0.15 | 0.15 | — |
| Methylethylketone | 40.0 | 40.0 | 40.0 | 40.0 | — |
| toluene | 30.0 | 30.0 | 30.0 | 30.0 | — |

The results of the evaluation on visibility of the transparent hard coat films (transparency, glare preventing property and RGB glare preventing property) obtained as shown below are shown in Table 3. The transparency, glare preventing property and RGB glare preventing property were evaluated as follows.

[Transparency]

The haze value (%) (JIS-K7105) was measured using an SM color computer HGM-2K (Suga Test Instruments) and whether or not displayed images blurred when a transparent hard coat film was laminated on a CRT screen displaying the images was evaluated visually. In Table 3, "o" indicates that the result of the visual evaluation result was good and "x" indicates that the result was bad.

[Glare preventing property]

The specular gloss (%) at an incident (light receiving) angle of 60° (JIS-K5400) was measured using an SM color computer UGV-5 K (Suga Test Instruments) and whether or not displayed images became difficult to see due to reflection of external light when a transparent hard coat film was laminated on a CRT screen displaying the images was evaluated visually. In Table 3, "o" indicates that the result of the visual evaluation result was good and "x" indicates that the result was bad.

[RGB glare preventing property]

It was evaluated visually whether white portions in the display screen particularly glared by RGB light-emitting points which were magnified and emphasized when a transparent hard coat film image was laminated on a CRT screen displaying color the images. In Table 3, "o" indicates that the result of the visual evaluation was good and "x" indicates that the result was bad.

[Visibility]

An overall rating of "o" (good) was given if all the three evaluation results (transparency, glare preventing property and RGB glare preventing property) were good. If any one of the three evaluations was bad, a rating of "x" (bad) was given.

TABLE 3

| | transparency (Haze Value) | glare preventing property (glossiness) | RGB glare-preventing property | visibility |
|---|---|---|---|---|
| Example 1 | o 6.2 | o 85.5 | o | o |
| Example 2 | o 5.1 | o 93.8 | o | o |
| Example 3 | o 7.5 | o 79.8 | o | o |
| Comparative Example 1 | o 4.5 | o 105.0 | x | x |
| Comparative Example 2 | o 1.5 | x 162.3 | o | x |
| Comparative Example 3 | x 12.7 | o 62.9 | x | x |
| Comparative Example 4 | o 1.7 | x 161.1 | o | x |
| Comparative Example 5 | o 7.4 | x 128.5 | x | x |

As clear from the results shown in Table 3, the transparent hard coat films 1 of Examples 1–3 achieved visibility excellent in all of transparency, glare preventing property and RGB glare preventing property.

On the other hand, the transparent hard coat films of Comparative Examples 1 and 3 had glare preventing property because gloss was suppressed to a low level, but since only relatively large-diameter inorganic particles were contained in the transparent hard coat layer, the screen glare by RGB light-emitting points could not be suppressed, resulting in very poor visibility. Particularly, the transparent hard coat film of Comparative Example 3 had a high haze value, also resulting in poor transparency.

The transparent hard coat films of Comparative Examples 2 and 4 had a low haze value, resulting in excellent transparency, but had high gloss, that is, extremely low glare preventing property, resulting in very poor visibility, because only relatively small diameter inorganic particles were contained in the transparent hard coat layer. Since relatively large-diameter inorganic particles were not contained in the transparent hard coat layer, gloss was not lowered, but screen glare due to lens effect at RGB light-emitting points was not generated because surface protrusions and recesses were not produced.

In the transparent hard coat film of Comparative Example 5, in which a thermosetting resin was used instead of an ionizing radiation curable resin, even though inorganic particles were added in the same amounts as in Example 1 (in which an ionizing radiation curable resin was used) so as to maintain transparency, there was no generation of wave-like protrusions and recesses, which are generated uniquely when particulate substances were mixed into the ionizing radiation curable resin. Consequently, gloss became high and glare preventing property could not be obtained. Since RGB glare preventing property could not be obtained either, visibility was very poor.

[Example 4]

To prepare the transparent hard coat film of Example 4, a first transparent hard coat layer coating solution (j) having the composition shown below was applied on one surface of a polyethylene terephthalate film having a thickness of 100 $\mu$m (COSMOSHINE A4300: Toyobo Co., Ltd.), heated and dried at 60° C. for 5 minutes and exposed to UV from a high-pressure mercury-vapor lamp for 1–2 seconds to form a first transparent hard coat layer having a thickness of about 5 $\mu$m. Subsequently, a second transparent hard coat layer coating solution (k) having the composition shown below was applied on the first transparent hard coat layer, heated and dried at 60° C. for 5 minutes and then exposed to UV from a high-pressure mercury-vapor lamp under an inert gas for 1–2 seconds to form a second transparent hard coat layer having a thickness of about 1 $\mu$m.

| <First transparent hard coat layer coating solution (j)> | |
|---|---|
| Ionizing radiation curable resin (Diabeam UR6530: Mitsubishi Rayon) | 30.0 parts |
| Inorganic particles (SYLYSIA 446, average diameter 4.5 $\mu$m: Fuji Silysia Chemical) | 1.5 parts |
| Photopolymerization initiator (IRGACURE 651: Ciba Specialty Chemicals) | 0.15 parts |
| Methylethylketone | 40.0 parts |
| Toluene | 30.0 parts |

| <Second transparent hard coat layer coating solution (k)> | |
|---|---|
| Ionizing radiation curable resin (Diabeam UR6530: Mitsubishi Rayon) | 30.0 parts |
| Inorganic particles (Aerosil 50, average diameter 30 nm: Nippon Aerosil) | 1.5 parts |
| Photopolymerization initiator (IRGACURE 651: Ciba Specialty Chemicals) | 0.15 parts |
| Methylethylketone | 40.0 parts |
| Toluene | 30.0 parts |

[Comparative Example 6]

The transparent hard coat film of Comparative Example 6 was prepared in the same way as in Example 4, except that the second transparent hard coat layer was not formed and only the first transparent hard coat layer was formed.

[Comparative Example 7]

The transparent hard coat film of Comparative Example 7 was prepared in the same way as in Example 4, except that the second transparent hard coat layer was formed directly on the surface of the polyethylene terephthalate film.

[Comparative Example 8]

To prepare the transparent hard coat film of Comparative Example 8, a first transparent hard coat layer coating solution (m) having the composition shown below was applied on one surface of a polyethylene terephthalate film having a thickness of 100 $\mu$m (COSMOSHINE A4300: Toyobo Co., Ltd.), heated and dried at 120° C. for 5 minutes to form a first transparent hard coat layer of a thickness of about 5 $\mu$m. Subsequently, a second transparent hard coat layer coating solution (n) having the composition shown below was applied on the first transparent hard coat layer, heated and dried at 120° C. for 5 minutes to form a second transparent hard coat layer having a thickness of about 1 $\mu$m.

| <First transparent hard coat layer coating solution (m)> | |
|---|---|
| Thermosetting silicon resin (Si coat 900, solid content 30%: Daihachi Chemical Industry) | 100.0 parts |
| Inorganic particles (SYLYSIA 446, average diameter 4.5 $\mu$m: Fuji Silysia Chemical) | 3.0 parts |

| <Second transparent hard coat layer coating solution (n)> | |
|---|---|
| Thermosetting silicon resin (Si coat 900, solid content 30%: Daihachi Chemical Industry) | 100.0 parts |
| Inorganic particles (Aerosil 50, average diameter 30 nm: Nippon Aerosil) | 3.0 parts |

The results of the evaluation on visibility (transparency, glare preventing property and RGB glare preventing property) of the transparent hard coat films obtained as above are shown in Table 4. The transparency, glare preventing property and RGB glare preventing property were evaluated in the same manner as in Examples 1–3.

TABLE 4

| | transparency (Haze Value) | glare preventing property (glossiness) | RGB glare-preventing property | visibility |
|---|---|---|---|---|
| Example 4 | ○ 5.5 | ○ 91.2 | ○ | ○ |
| Comparative Example 6 | ○ 5.9 | ○ 88.4 | x | x |
| Comparative Example 7 | ○ 1.1 | x 161.7 | ○ | x |
| Comparative Example 8 | x 15.3 | ○ 92.6 | x | x |

As clearly shown by the results in Table 4, the transparent hard coat film of Example 4 could obtain visibility excellent in all of transparency, glare preventing property and RGB glare preventing property.

On the other hand, the transparent hard coat film of Comparative Example 6 had transparency and glare preventing property, but since no second transparent hard coat layer was laminated on the first transparent hard coat layer, screen glare due to RGB light-emitting points could not be suppressed, resulting in very poor visibility.

The transparent hard coat film of Comparative Example 7 had a low haze value, that is, excellent transparency, but had high gloss, resulting in extremely low glare preventing property, that is, very poor visibility, because the first transparent hard-coat layer was not provided and only the second transparent hard coat layer was provided. Since relatively large diameter inorganic particles were not contained in the second transparent hard coat layer, gloss was not lowered, but screen glare due to lens effect at RGB light-emitting points was not generated because protrusions and recesses were not generated on the surface.

In the transparent hard coat film of Comparative Example 8, in which a thermosetting resin was used instead of an ionizing radiation curable resin, since inorganic particles were added in a greater amount than in Example 4 so as to obtain glare preventing property, transparency was degraded and glare preventing property could not be obtained, resulting in very poor visibility.

What is claimed is:

1. A transparent hard coat film comprising a transparent polymer film and one or more transparent hard coat layers including at least an ionizing radiation curable resin and two or more kinds of inorganic particles having different average diameters provided in the transparent polymer film, each of said inorganic particles being present in said transparent polymer film in the amount of 1–8 parts by weight per 100 parts by weight of said ionizing radiation curable resin.

2. The transparent hard coat film of claim 1, wherein the inorganic particles are at least two kinds of inorganic particles having an average diameter of 1–15 $\mu$m and an average diameter of 5–50 nm.

3. The transparent hard coat film of claim 2 wherein said inorganic particles having an average diameter of 1–15 $\mu$m are present in said transparent polymer film in the amount of 2–6 parts by weight per 100 parts by weight of said ionizing radiation curable resin and said inorganic particles having an average diameter of 5–50 nm are present in said transparent polymer film in the amount of 2–6 parts by weight per 100 parts by weight of said ionizing radiation curable resin.

4. The transparent hard coat film of claim 3, wherein said inorganic particles consist of said two kinds.

5. The transparent hard coat film of claim 2 wherein said inorganic particles consist of said two kinds.

6. The transparent hard coat film of claim 1, wherein the transparent hard coat layer is a single layer and contains two or more kinds of inorganic particles having different average diameters.

7. The transparent hard coat film of claim 1, wherein the transparent hard coat layer comprises a first transparent hard coat layer containing inorganic particles having a relatively large average diameter and a second transparent hard coat layer containing inorganic particles having a relatively small average diameter, the first transparent hard coat layer and second transparent hard coat layer being formed on the transparent polymer film in this order.

8. A transparent hard coat film comprising a transparent polymer film, a first transparent hard coat layer containing at least an ionizing radiation curable resin and inorganic particles having an average diameter of 1–15 $\mu$m and a second transparent hard coat layer containing at least an ionizing radiation curable resin and inorganic particles having an average diameter of 5–50 nm, the first and second transparent hard coat layers being successively formed on the transparent polymer film.

9. The transparent hard coat film of claim 8, wherein the thickness of the first transparent hard coat layer is 2–15 $\mu$m and the thickness of the second transparent hard coat layer is 0.2–1.5 $\mu$m.

* * * * *